Patented Dec. 23, 1952

2,623,064

UNITED STATES PATENT OFFICE 2,623,064

FLUORESCENT AGENTS

William W. Williams and Harlan B. Freyermuth, Easton, Pa., assignors to General Aniline & Film Corporation, New York, N. Y., a corporation of Delaware No Drawing. Application November 3, 1950, Serial No. 194,016

6 Claims. (Cl. 260—507)

This invention relates to improved fluorescent agents derived from diaminostilbenedisulfonic and dicarboxylic acids and a process for producing them. The normal fluorescent agents of the present invention may be represented by the following general formula:

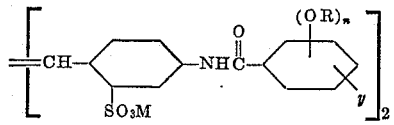

where M is hydrogen or a cation preferably alkali metal or alkaline earth metal, R may be an unsaturated short chain aliphatic radical or halo substituted unsaturated aliphatic radical having a chain length preferably not more than four carbon atoms; i. e. R may be $CH_2=CHCH_2-$, $CH_2=C(CH_3)CH_2-$, $CH_2=C(Cl)CH_2-$, $CH_3CH=CHCH_2-$, $HC\equiv CCH_2-$; $n$ is a small integer, i. e., 1, 2 or 3 and $y$ is hydrogen, alkyl (1 carbon atom) or alkoxy.

These compounds are readily prepared by condensing one molecular proportion of 4,4'-diamino-2,2'stilbenedisulfonic acid with an excess above two molecular proportions of an unsaturated aliphatic ether of a hydroxybenzoyl chloride. The unsaturated aliphatic ether of a hydroxybenzoyl chloride can be readily prepared by the reaction of a lower aliphatic (preferably methyl, ethyl or allyl) ester of a hydroxybenzoic acid with the unsaturated aliphatic halide corresponding to the unsaturated ether group it is desired to introduce, followed by hydrolysis of the ester and subsequent treatment with a halogenating agent (e. g., $POCl_3$, $PCl_3$, thionyl chloride) to produce the acid halide.

These compounds may also be prepared by reacting an unsaturated aliphatic ether of a hydroxy benzoic acid with 4,4'-diamino-2,2'-stilbene disulfonic acid in the presence of a halogenating agent (as above) a tertiary N-base (e. g., pyridine, N - diethylcyclohexylamine, tributylamine) and a non-polar solvent.

These products are useful when incorporated into paper or other wrapping material to improve the whiteness as well as to protect the contents from the action of ultraviolet light. When applied to fabrics by methods well known in the art, the whitness is remarkably improved. The white background of photographic prints and diazotype prints can be improved by incorporating some of the material into the coating formulations. By addition of the substances to discharge pastes, the whites obtained upon discharge are decidedly whiter than those discharges made in the absence of said materials.

If small quantities of these materials are added to soaps or other detergents, fabrics which are washed using these formulations will be much whiter in the case of whites and much brighter in the case of colors than fabrics which are washed with ordinary soaps or detergents. These materials may be used to bleach fabrics. In such cases, the amount of bleach necessary is materially reduced and one or more steps in the bleaching operation may be eliminated.

The preparation of an example of the above mentioned types is illustrated in the following example.

Example 1

A mixture of 10.9 parts 4,4'-diamino-2,2'-stilbenedisulfonic acid, 35 parts of water, 9 parts of sodium carbonate (as 20% aqueous solution) and 60 parts of acetone is cooled to less than 10° C. A solution of 21.2 parts of 2 - allyloxybenzoyl chloride in 16 parts of acetone is added dropwise with the temperature maintained at or below the above figure during the addition. At the end of two hours' time, mixture is allowed to warm to room temperature. The reaction is maintained alkaline to Brilliant Yellow paper throughout by the addition of 20% aqueous sodium carbonate solution. The product is isolated by filtration. It corresponds to the formula:

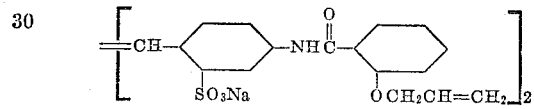

When this material is incorporated into discharge pastes and applied to fabrics, the whites thus obtained are remarkably whiter than those obtained using ordinary discharge pastes. When this material is applied to fibers of cellulose, wool or nylon, by methods well-known in the art, the white appearance of the fabric is thereby much improved.

When small amounts of this substance are added to soaps or detergents and the resulting mixtures are used to wash fabrics of cellulose, wool or nylon, the white materials thus washed are significantly whiter in appearance and colored materials are brighter than similar materials which are washed using ordinary soaps or detergents.

Example 2

The procedure of Example 1 is followed except that 21 parts of 4-allyloxybenzoyl chloride are used in place of 21.2 parts of 2-allyloxybenzoyl chloride. A product of the following composition is obtained.

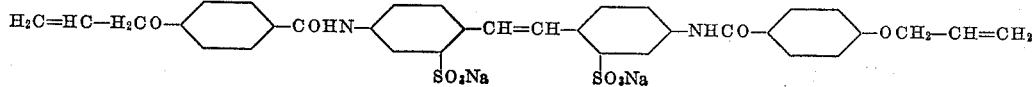

The product has excellent affinity for cotton and imparts a considerable whitening effect to the fiber. The shade of fluorescence of the dyeing is redder than that of Example 1.

It has also been found that the amides obtained by condensing 4,4'-diamino-2,2'-stilbenedisulfonic acid with allyl or other unsaturated aliphatic (3-4 carbon atoms) ethers of other hydroxybenzoyl chlorides have substantially similar properties to the amides of the salicylic acid ethers mentioned above, and are valuable fluorescent agents. As examples of other monohydroxybenzoic acids the chlorides of whose allyl or other unsaturated aliphatic (3-4 carbon atoms) ethers may be employed in place of the 2-allyloxybenzoyl chloride and 4-allyloxybenzoyl chloride used in the foregoing example, there may be mentioned m- and p-hydroxybenzoic acid and also any of the cresotic acids, i. e., 2,3- 2,4- 2,5- and 2,6-cresotic acids and 3,2- 3,4- and 3,6-cresotic acid and 4,2- and 4,3-cresotic acids.

It will also be understood that the amides obtained by condensation of the acid chlorides of diethers of dihydroxybenzoic acid or the triethers of trihydroxybenzoic acids in which at least one of the ether groups is an unsaturated aliphatic (3-4 carbon atoms) ether group have properties similar to those of the specific compounds prepared in the foregoing examples and are, therefore, included within the scope of the present invention. As examples of dihydroxybenzoic acids whose unsaturated ethers may be used there may be mentioned; 2,4- 2,3- 2,5-, 2,6- 3,4- and 3,5-dihydroxybenzoic acid and as examples of the ethers may be mentioned those in which both hydroxy groups of the acid are replaced by an allyloxy group and the other by an alkoxy group (e. g. methoxy or benzyloxy) i. e., 2,5-allyloxybenzoic acid, 2,4-allyloxybenzoic acid and 3-methoxy-4-allyloxybenzoic acid. As examples of trihydroxybenzoic acids whose ethers may be employed there may be mentioned 2,4,6- 2,3,4- 2,4,5- and 3,4,5-trihydroxybenzoic acids. As examples of the ethers of such trihydroxy acids which may be employed there may be mentioned 2,4,6-triallyloxybenzoic acid or the triallyloxy ethers of the other trihydroxybenzoic acids mentioned above, also the mixed diallyloxy monoalkoxy ethers or monoallyloxy dialkoxy ethers of these acids obtained by esterification of the acids with mixtures of allyl and alkyl halides.

The preparation of specific fluorescent compounds of this type is illustrated by the following specific examples:

*Example 3*

Distil a mixture of 72 parts of 4,4'-diamino-2,2'-stilbenedisulfonic acid, 105 parts of 2,4-diallyloxybenzoic acid (hydrolysis product of reaction of methyl 2,4-dihydroxybenzoate and allyl chloride), 139.5 parts of diethylcyclohexylamine and 1040 parts of toluene, taking off approximately 520 parts of distillate to remove traces of water. This distillate contains from 0.10 to 0.21% of diethylcyclohexylamine. Cool the charge to 100° C. and add simultaneously and slowly, from separate feed lines, 15.5 parts of diethylcyclohexylamine and 41 parts of phosphorus trichloride while raising the temperature to reflux. Reflux for 8 hours, then cool and add 500 parts of water, preferably containing a small quantity of sodium carbonate. Distil at constant volume by separating the water layer and returning it to the charge continuously until the toluene has been removed from the charge. 455 parts of distillate are obtained containing from 0 to a few per cent of diethylcyclohexylamine, depending on the quantity of sodium carbonate added. Continue the distillation while adding slowly, over 4 hours, 124 parts of 40% sodium hydroxide solution. 112 parts of diethylcyclohexylamine of 96-99% purity is recovered in the distillate. Add 60 parts of common salt to the remaining aqueous charge and cool to room temperature. Filter, wash the product with 10% brine and dry.

*Example 4*

The procedure of Example 3 above was followed except that 94 parts of 2-allyloxy-4-methoxybenzoic acid (reaction of dimethyl sulfate on 2,4-dihydroxybenzoic acid followed by reaction of allyl chloride and hydrolysis of ester) in place of the 105 parts of 2,4-diallyloxybenzoic acid. Product equal to Example 3.

*Example 5*

The procedure of Example 3 above was followed except that 128 parts of 2-allyloxy-4-benzyloxybenzoic acid (hydrolysis product from reaction of methyl 2,4-dihydroxybenzoate and benzyl chloride and allyl chloride) in place of the 105 parts of the 2,4-diallyloxybenzoic acid. Product equivalent to Example 3 in brightening activity.

It will be understood that the primary feature of novelty in the novel compounds of this invention is the presence therein of the terminal acyl groups derived from an unsaturated aliphatic ether of a hydroxybenzoic acid. It has been found that the amides obtained by condensing diaminostilbenedisulfonic acid with unsaturated aliphatic (3-4 carbon atoms) ethers of hydroxybenzoyl chlorides, as a class, possess substantially similar properties and are valuable fluorescent agents. In the foregoing examples the allyloxy ethers have been used for the purpose of illustration. However, corresponding compounds in which the allyloxy groups are replaced by other unsaturated 3 or 4 carbon atom ether groups are also included within the scope of the present invention and have very similar properties. Such compounds may be obtained by a condensation with the diaminostilbenedisulfonic acid with unsaturated ethers of hydroxybenzoyl chlorides corresponding to any of the previously mentioned allyloxybenzoic acids in which the allyloxy groups are replaced by such groups as methallyloxy, γ-chlorallyloxy, 1-chloro-2-butenoxy or propargyloxy groups. Such unsaturated ethers may be prepared by reaction of an ester (preferably the methyl ester) of any of the hydroxybenzoic acids mentioned above with methallyl chloride, γ-chlorallyl chloride, 1-chloro-2-butene and propargyl chloride, respectively. The acid chloride of such unsaturated ethers may be obtained by hydrolysis of the ester followed by treatment with thionyl chloride and the novel amide of this invention thus may be obtained by condensations of the thus obtained acid chloride with diaminostilbenedisulfonic acid as described in the foregoing examples.

In common with other fluorescent agents derived from 4,4'diaminostilbenesulfonic and carboxylic acids it has been found that the amides derived from 4,4'diamino-2,2'stilbene-disulfonic acid in general fluoresce more strongly than those derived from other stilbenesulfonic and carboxylic acids. The amides derived of 4,4'-diamino-2,2'stilbenedisulfonic acid, therefore, represent the preferred embodiment of the present invention. However, the corersponding amides derived from other diaminostilbenesulfonic or carboxylic acids are also fluorescent agents and may be prepared if desired, although the fluorescence is generally somewhat weaker. As examples of such other 4,4'diaminostilbene acids may be mentioned 4,4'diamino-3,3'stilbenedisulfonic acid; 4,4'diamino-2,2', 6,6'stilbenetetrasulfonic acid; 4,4'diamino-2,2'-stilbenedicarboxylic acid and 4,4'-diamino-3,3'-stilbenedicarboxylic acid.

The novel derivatives of diaminostilbenesulfonic or carboxylic acids embraced within the present invention fluoresce with a greenish blue shade which is considered by many to be superior to the somewhat violet shades exhibited by other known fluorescent agents which have been suggested for use as brightening agents. The novel products of the present invention also show superior stability to bleach treatments commonly employed in textile laundering and have other properties desired in fluorescent brightening agents.

It will be apparent that the novel fluorescent agents of the present invention when produced in accordance with the foregoing example are obtained in the form of their sodium salts. However, the potassium salts have substantially similar properties and it will be apparent that the potassium salts may be obtained by using potassium carbonate in place of sodium carbonate for the condensation of the diaminostilbene acid with the unsaturated aliphatic ether of the hydroxybenzoyl chloride. The free acids may be obtained by acidification of the sodium or potassium salts; while other salts such as the ammonium or hydroxyalkylamine salts may be obtained by neutralization of the free acids. Where spirit soluble products are desired, for instance, in brightening of lacquers, etc., the higher alkyl or cycloalkylamine salts of the free acids such as the cyclohexylamine salts of the free acids may be produced by methods known in the art. The alkaline earth metal salts such as the barium and calcium salts which may be obtained from the free acid or by double decomposition of the sodium or potassium salts have been found to be particularly useful for the brightening of photographic prints.

We claim:

1. Compounds selected from the group consisting of compounds of the formula—

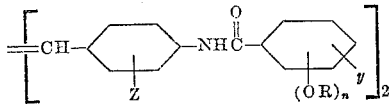

wherein R represents a short unsaturated aliphatic hydrocarbon radical of 3 to 4 carbon atoms, $n$ is an integer of 1 to 3, $y$ is a member of the group consisting of hydrogen, lower alkyl and lower alkoxy and Z represents a member of an acid group consisting of carboxylic and sulfonic acid groups and the salts of such compounds.

2. Compounds selected from the group consisting of compounds of the formula

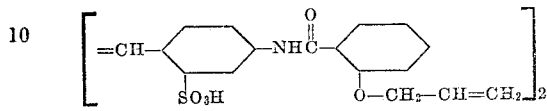

and salts thereof.

3. Compounds selected from the group consisting of compounds of the formula

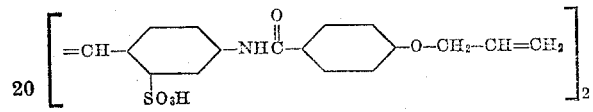

and salts thereof.

4. Compounds selected from the group consisting of compounds of the formula

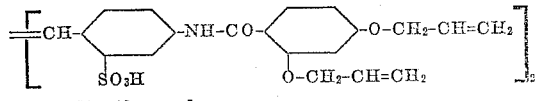

and salts thereof.

5. Compounds selected from the group consisting of compounds of the formula

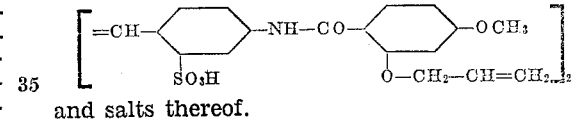

and salts thereof.

6. Compounds selected from the group consisting of compounds of the formula

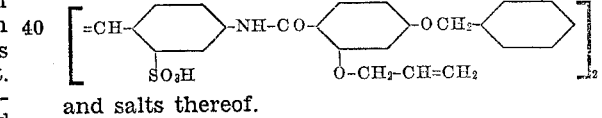

and salts thereof.

WILLIAM W. WILLIAMS.
HARLAN B. FREYERMUTH.

REFERENCES CITED

The following references are of record in the file of this patent:

UNITED STATES PATENTS

| Number | Name | Date |
|---|---|---|
| 2,089,293 | Paine et al. | Aug. 10, 1937 |
| 2,089,413 | Rendell et al. | Aug. 10, 1937 |
| 2,468,431 | Eberhart et al. | Apr. 26, 1949 |
| 2,521,665 | Hausermann | Sept. 5, 1950 |